H. M. DARLING.
LATHE CHUCK.
No. 96,207. Patented Oct. 26, 1869.
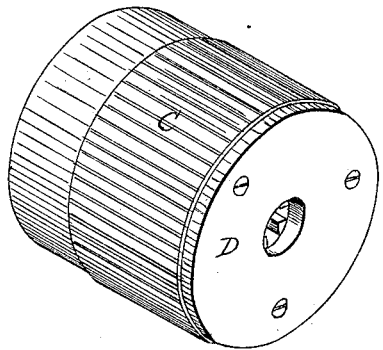
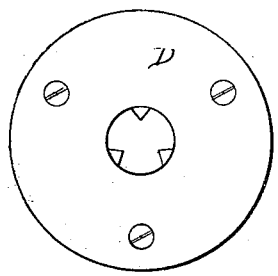
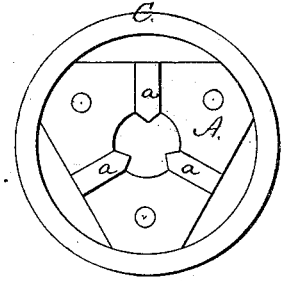
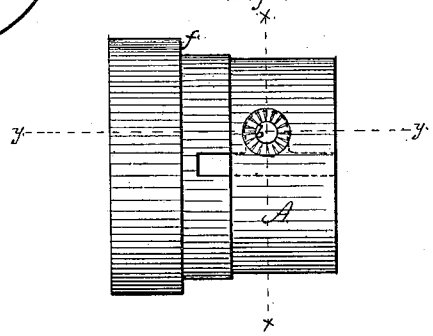
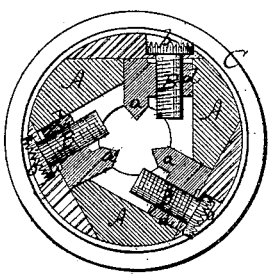
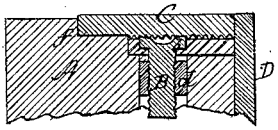

United States Patent Office.

H. M. DARLING, OF BRIDGEPORT, CONNECTICUT.

Letters Patent No. 96,207, dated October 26, 1869.

IMPROVED LATHE-CHUCK.

The Schedule referred to in these Letters Patent and making part of the same.

*To all whom it may concern:*

Be it known that I, H. M. DARLING, of Bridgeport, in the county of Fairfield, and State of Connecticut, have invented a new Improvement in Lathe-Chucks; and I do hereby declare the following, when taken in connection with the accompanying drawings, and the letters of reference marked thereon, to be a full and exact description of the same, and which said drawings constitute part of this specification, and represent in—

Figure 1, a perspective view.
Figure 2, a front end view.
Figure 3, a front end view with the cap removed.
Figure 4, a side view, the screw-ring and plate removed.
Figure 5, a section on line $x\,x$.
Figure 6, a section on line $y\,y$.

This invention relates to an improvement in the instrument employed in lathes for holding drills, and commonly called "lathe-chucks," and my improvement is in that class which carries three radial jaws, all simultaneously toward or from a common centre; and The invention consists in the arrangement in each of the jaws, of a screw parallel to the radial line of the respective jaws, the head of the screw toothed, so as to be worked by the internal thread of a ring set over the chuck, and so that by the turning of the said ring, the screw will be revolved, and move the jaws toward or from the centre, as the case may be.

To enable others skilled in the art to use and construct my invention, I will proceed to describe the same, as illustrated in the accompanying drawings.

A is the body of the chuck, within which are fitted three radial jaws, $a\,a\,a$, as seen in figs. 3 and 5, each of the said jaws provided upon each side with a lug, $d$, as seen in fig. 5, to receive each a screw, B, as also seen in fig. 5, arranged so that by the turning of the said screws, the jaws will be moved toward or from the centre, accordingly as the screws are turned.

The head $b$ of each screw is toothed, as seen in figs. 4 and 5, and over the body of the chuck a ring, C, is passed, having upon its inner surface a screw-thread, as denoted in figs. 5 and 6.

This ring rests against a shoulder, $f$, at its rear, and on the front a plate, D, is fixed to prevent the ring moving longitudinally on the chuck, as seen in fig. 6.

As the screws are set parallel to the radial line in which the jaws move, it follows that the head projects above the surface of the body of the chuck only at one point, as seen in fig. 5, hence, the internal thread of the ring C only operates at that point; therefore, by turning the said ring, which has no lateral movement, the screw-thread on the ring will, at each full revolution, turn all the screws one tooth of the head, therefore, by continual revolution of the ring, the jaws will be moved toward or from the centre, according to the direction in which the ring revolves.

Having therefore thus fully described my invention,

What I claim as new and useful, and desire to secure by Letters Patent, is—

In combination with the radial jaws $a$, their respective screws B, with toothed heads $b$, arranged relatively to the jaw, and the internally threaded ring C, operating in the teeth of the screw-head so as to move the jaws, substantially in the manner as herein set forth.

H. M. DARLING.

Witnesses:
JOHN E. EARLE,
JOHN H. SHUMWAY.